United States Patent [19]

Ambrose

[11] 4,070,420

[45] Jan. 24, 1978

[54] THERMOPLASTIC ELASTOMERS PREPARED VIA CATIONIC GRAFTING

[75] Inventor: Richard Joseph Ambrose, Akron, Ohio

[73] Assignee: The Firestone Tire and Rubber Company, Akron, Ohio

[21] Appl. No.: 723,412

[22] Filed: Sept. 15, 1976

[51] Int. Cl.² .......................................... C08F 279/02
[52] U.S. Cl. ................................................ 260/880 R
[58] Field of Search ............... 260/878 R, 879, 880 R; 526/185

[56] References Cited

U.S. PATENT DOCUMENTS

| | | | |
|---|---|---|---|
| 3,439,065 | 4/1969 | Luftglass | 260/880 R |
| 3,494,983 | 2/1970 | Diem | 260/878 R |
| 3,669,947 | 6/1972 | Kahn | 526/175 |
| 3,904,708 | 9/1975 | Kennedy | 260/880 R |
| 3,933,942 | 1/1976 | Kennedy | 260/880 R |
| 3,981,944 | 9/1976 | Okamoto | 260/880 R |

Primary Examiner—Paul R. Michl

[57] ABSTRACT

Thermoplastic elastomers having improved high service temperatures and increased tensile strength are prepared by grafting cationic polymerizable monomer, such as alpha-methyl styrene, to halogenated backbone such as chlorinated polybutadiene, said grafting being effected in the presence of inert organic solvent and alkyl aluminum catalyst together with a controlled amount of water to achieve an improved polymerization rate and increased monomer conversion.

1 Claim, No Drawings

THERMOPLASTIC ELASTOMERS PREPARED VIA CATIONIC GRAFTING

PRIOR ART

The prior art, as represented for example by U.S. Pat. Nos. 3,904,708 and 3,933,942 specifically teaches the use of solvent, cationically polymerizable monomer, the use of alkyl aluminum as coinitiator and the grafting onto halogenated backbone; this prior art technology teaches nothing about the effect water would have on any cationic polymerization system.

U.S. Pat. No. 3,669,947 is directed to the homopolymerization of alpha-methyl styrene in an inert organic solvent such as toluene, in a free radical system wherein water and Friedel-Crafts halide act as co-catalyst to shorten the polymerization time. This is a distinctly different initiator system from that herein claimed and does not require, for example, the presence of backbone polymer with labile halide.

U.S. Pat. No. 3,494,983 is directed to an interpolymerization system involving diolefin polymer and at least two olefin monomers; dialkyl aluminum catalyst is utilized and toluene as solvent medium with or without water; a heavy metal compound functions as co-catalyst and the product is sulfur curable. In contrast to this disclosure, applicant's process is one of cationic grafting from halogenated backbone with, for example, alpha-methyl styrene, alkyl aluminum being utilized as catalyst with a controlled amount of water in inert organic solvent to achieve improved polymerization rate and higher monomer conversion.

BACKGROUND OF THE INVENTION

Thermoplastic elastomers have been prepared by connecting glassy segments with rubbery segments in the form of block or graft copolymers. Graft copolymers having the proper structure for good thermoplastic elastomer properties can be prepared according to cationic grafting "from" polymerization techniques.

While the cationic graft polymerization prior art specifically teaches the use of inert solvent, monomer and alkyl aluminum coinitiator, it teaches nothing about the need for, use or effect of water on both the grafting rate and ultimate monomer conversion. This same prior art also fails to teach or suggest anything about the use or effect water, as herein described and claimed, would have as regards the improved tensile and service temperature properties of my graft polymer. I have discovered that the addition of water increases both the rate of grafting and the ultimate monomer conversion. Thus the presence of a small amount of water in the polymerization medium is not only desirable, but necessary where high monomer conversions are required.

THE INVENTION

My invention is directed to the grafting of cationically polymerizable monomers from halogenated backbones in the presence of inert organic solvent and alkyl aluminum coinitiator, the improvement being one wherein said grafting is conducted in the presence of from about $0.2 \times 10^{-3}$M to about $5.0 \times 10^{-2}$M water; the use of $1.5 - 2.5 \times 10^{-3}$M is preferred.

A significant advantage of the thermoplastic elastomers produced in the practice of my invention includes the preparation of such elastomers which unexpectedly reflect increased high service temperatures of to about, for example, 90° C. Prior to the present invention, the maximum high service temperature achieved was about 60° C.; improved tensile strength properties are also achieved and these two properties have significance in the manufacture of, for example, shoe soles and tennis shoes which would normally soften and lose shape on washing and drying of same in normal laundry facilities.

I also discovered that the use of a controlled amount of water improved the cationic grafting rate in addition to significantly increasing the amount of monomer ultimately converted.

It is preferred to introduce the water dissolved in the inert organic solvent, such as toluene. Other means can be utilized; the essential requirement is that the water must be added prior to addition of the alkyl aluminum co-catalyst.

DETAILED DESCRIPTION OF THE INVENTION

In the practice of my invention, chlorinated polybutadiene (0.25-1.5% Cl), for example, is dissolved in toluene containing $1.0-3.0 \times 10^{-3}$M water. Solids vary from 3-12 percent by weight. The prescribed amount of monomer(s), such as alphamethyl styrene, is then added and the solution is cooled to $-35°$ to $-50°$ C. At this time, the co-catalyst (i.e., trimethyl aluminum) is added at a concentration of $1-2 \times 10^{-2}$M. The reaction proceeds immediately as observed by an exotherm of 3°-20° C. depending on monomer concentration. Reaction time allowed was sometimes up to 1 hour, however, in most cases the reaction was complete in 5-10 minutes. Quenching with sodium methoxide was used as a means to terminate the reaction. The polybutadiene-g-alpha-methyl styrene copolymer was recovered by precipitation with methanol. Compositions containing, for example, from 20-70 percent alpha-methyl styrene have been prepared; however, those containing from 30-50 percent by weight are most desirable for good elastomeric properties. This unique procedure results in monomer conversion of 70-100 percent after 10 minutes reaction time.

Tensile properties of these graft copolymers at room temperature showed ultimate elongations from 300 to 1000 percent and tensile strengths from 3000 - 5500 psi.

Hot properties at 80° C. showed ultimate elongations from 200-800 percent and tensile strengths from 800-1800 psi. These hot properties are compared to the commercially available Kratons which have ultimate elongations of 400-800 percent and tensile strengths from 100-300 psi at 80° C.

When the above procedure is employed in the absence of water, I obtained 9 percent monomer conversion after 10 minutes. This percent conversion did not change substantially even after two hours total reaction time.

Tensile properties of these copolymers were very poor. In fact, the copolymers were too weak and cheeselike to test. Accordingly, water is a required component in polymerization to increase not only the polymerization rate but also the ultimate monomer conversion.

The following Example is representative; all parts are by weight percent unless otherwise designated.

EXAMPLE

A. 38 g. of chlorinated polybutadiene (0.4 percent by weight chlorine) was dissolved in 800 cc of toluene containing $2.0 \times 10^{-3}$M water. To this was added 27.8 cc of alpha-methyl styrene monomer (25.2 g) and the solution was cooled to $-50°$ C. At this time, 8.0 cc of 1.29 M Me$_3$Al was added and an exotherm from $-50°$ to $-43°$ C. was observed almost immediately. The reaction was allowed to proceed for 10 minutes at which time 2 ml. of 10% NaOMe in methanol was added to terminate the reaction. Monomer conversion was nearly quantitative (> 95%) as judged by both polymer recovery and copolymer composition.

B. When the above reaction was repeated using dry toluene, no exotherm was observed. Monomer conversion was 9 percent as measured by copolymer composition. Attempts were made to increase this conversion by allowing the reaction to proceed for longer reaction times (2–3 hours); no appreciable change in monomer conversion was seen.

Tensile properties of the copolymer prepared in (A) above are as follows:

| Test Temp. °C. | alpha-methyl styrene content, Wt. % | Elongation % | Modulus (psi) | | | |
|---|---|---|---|---|---|---|
| | | | 100 | 300 | 500 | break |
| 23° | 39 | 570 | 390 | 880 | 1920 | 2350 |
| 80° | 39 | 550 | 285 | 480 | 870 | 965 |

The tensile properties of the copolymer prepared in the dry toluene, Example (B), could not be determined. The polymer was too weak to test.

The preceding Example can be varied within the context of my total specification disclosure as it would be construed by one skilled in the art; variable conditions and equivalent reactants and components can be substituted in this Example to achieve substantially the same results with only a minimum of routine experimentation.

It is understood that my alkyl aluminum coinitiator functions as a co-catalyst with the halogenated polymeric backbone and that any of the coinitiator (co-catalyst) alkyl aluminum systems of U.S. Pat. No. 3,904,708 can be utilized in the practice of my invention; this patent is incorporated by reference for its disclosure as to (1) operable coinitiator, co-catalyst systems, (2) operable cationic polymerizable monomers, (3) operable halogenated polymeric backbones and (4) operable inert organic solvents. My invention represents, in essence, a technical and significant process and product improvement of this basic cationic polymerization technology. Each of the preceding known components can be utilized singly or as mixtures in the practice of my invention.

In the practice of my invention, the following represent practical and preferred ranges which can be utilized:

1. The alkyl aluminum coinitiator is preferably used at a concentration of 1.25 to 1.50 $\times$ 10$^{-2}$M; an operable range is from about 0.5 to about 5.0 $\times$ 10$^{-2}$M;
2. Although the use of atmospheric pressure is preferred, pressures up to about 3 atmospheres and those under vacuum can be used;
3. The halogenated polymeric backbone preferably contains 0.4 to 0.8% by weight halogen; said backbone can, however, contain from about 0.1 to about 5% by weight halogen;
4. The halogenated backbone of (3) is preferably present at a concentration of 0.025 to 0.05 gram per cc; an operable concentration range would be from about 0.01 to about 1.0 gram per cc; an acceptable viscosity must be maintained;
5. The temperature of reaction can range from about $-90°$ C. to about 70° C.; the preferred range is from $-55°$ C. to $-45°$ C.;
6. The cationically polymerizable monomer can be utilized in an amount of from about 0.05 to about 2.0 molar; a preferred range is from 0.2 to 0.3 molar;
7. The monomer grafted onto the final copolymer would be from 1 to 99 weight percent; 25 to 50 weight percent is preferred;
8. The inert organic solvent can be, for example, toluene, xylene, or, mesitylene; the use of toluene is preferred; the solvent can be used in a range of from about 50 to about 99 weight percent; 90 to 95% by weight solvent is preferred. It is most preferred to dissolve my water component in dry toluene;
9. The water concentration in my reaction system can be from about 1.5 to about 2.5 $\times$ 10$^{-3}$M preferred; from about 0.2 $\times$ 10$^{-3}$M to about 5.0 $\times$ 10$^{-2}$M can be effectively utilized.

The thermoplastic elastomers produced in the practice of my invention can be advantageously utilized in the manufacture of elastomeric products that are subjected to high service temperature conditions and/or high tensile stresses. Representative products that can be prepared with my thermoplastic elastomer include, for example, shoe soles, tennis shoes, radiator hose, vibration dampners and hot melt adhesive formulations.

What is claimed is:

1. In the process for grafting alpha-methyl styrene from chlorinated polybutadiene in the presence of toluene and trimethyl aluminum, the improvement wherein said grafting is conducted in the presence of from about 1.5 to about 2.5 $\times$ 10$^{-3}$M water dissolved in said toluene, said water and toluene being added prior to the addition of said trimethyl aluminum.

* * * * *